July 31, 1951 — J. LOTHEN — 2,562,625
TILLER ATTACHMENT FOR PLOWS
Filed Sept. 27, 1948
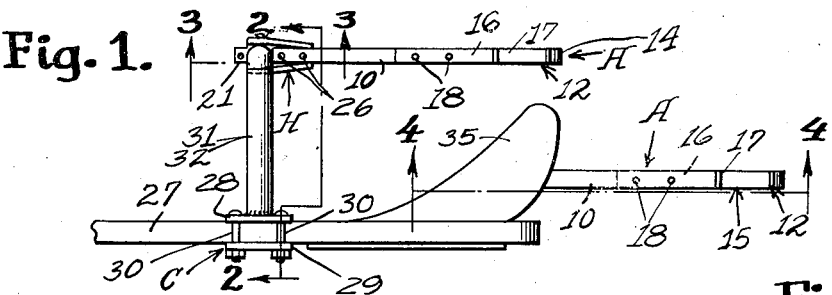
Fig. 1.
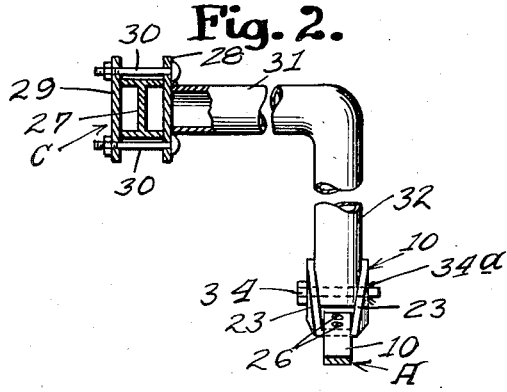
Fig. 2.
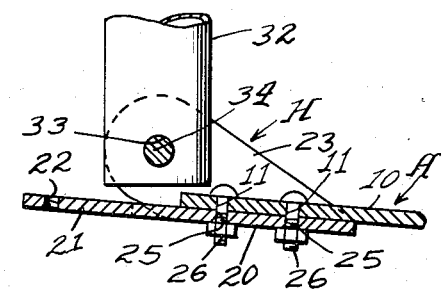
Fig. 3.
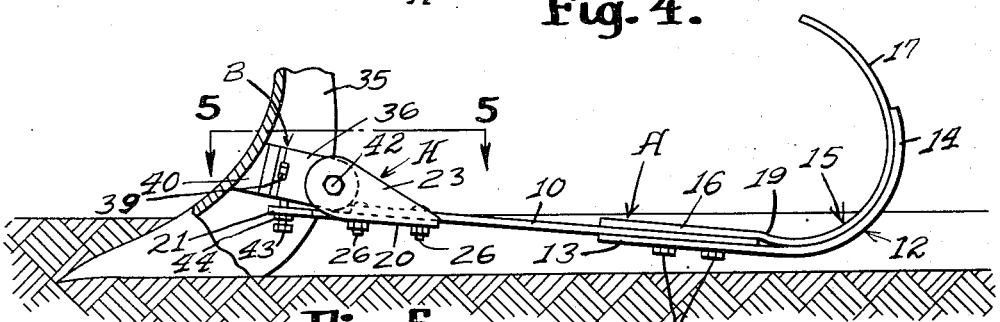
Fig. 4.
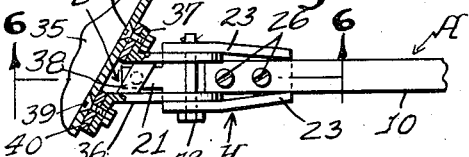
Fig. 5.
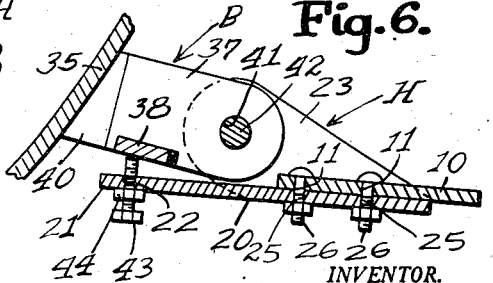
Fig. 6.
Fig. 7.
INVENTOR.
Julius Lothen
BY Wilfred Lawson
Attorney Patented July 31, 1951

2,562,625

UNITED STATES PATENT OFFICE 2,562,625

TILLER ATTACHMENT FOR PLOWS

Julius Lothen, Winger, Minn.

Application September 27, 1948, Serial No. 51,337

3 Claims. (Cl. 97—5)

1

The invention relates to plow attachments and more particularly to a tiller attachment.

The primary object of the invention is to provide an upwardly curved spring tiller attachment adapted to be detachably secured to the moldboard of a plow.

Another object of the invention is to provide a tiller attachment of the character indicated above adapted to be adjusted so that it follows the plow in the preceding open furrow and works the soil turned by the adjacent plow from the bottom of the seed bed.

A further object of the invention is to provide a tiller attachment adapted to be detachably secured to an arm attached to and laterally extending from a plow beam.

The invention consists in the details of construction and in the combination of the several parts of my improved plow attachments whereby certain advantages are attained, as will be hereinafter more fully set forth.

In order that my invention may be better understood, I will now proceed to describe the same with reference to the accompanying drawings, wherein:

Figure 1 is a view in top plan of the rear end portion of a plow beam to which a laterally extending arm and the moldboard of a plow is secured, a tiller attachment in accordance with the invention being attached to each of these two parts.

Figure 2 is a view in section taken on line 2—2 in Figure 1.

Figure 3 is a view in section taken on line 3—3 in Figure 1.

Figure 4 is a view in section taken on line 4—4 in Figure 1.

Figure 5 is a view in section taken on line 5—5 in Figure 4.

Figure 6 is a view in section taken on line 6—6 in Figure 5.

Figure 7 is a view in perspective of a hinge member used for connecting the spring tiller in accordance with the present invention with a plow.

The tiller attachment as herein embodied comprises a tiller arm A consisting of a straight bar 10 provided adjacent to one of its ends hereinafter called the front end, with a plurality of equidistantly spaced holes 11. A lower tiller member 12 has a straight front portion 13 and an upwardly curved rear end portion 14. An upper tiller member 15 has a straight front end portion 16 and an upwardly curved rear end portion 17. The straight front end portion 13 of

2 the lower tiller member 12 is arranged underneath the rear end portion of the straight bar 10 and the straight front end portion 16 of the upper tiller member 15 is placed on top of the rear end portion of the straight bar 10. The three overlying end portions are held rigidly together by means of a plurality of screws 18. The curved rear end portion 17 of the upper tiller member 15 is offset downwardly as at 19 so that the said end portion is arranged in close contact with the rear end portion 14 of the lower tiller member 12. The end portion 17 extends upwardly and forwardly beyond the end portion 14.

A hinge member H comprises a flat bottom 20 having a narrowed front end portion 21 provided with a centrally located tapped hole 22. At each longitudinal side edge the bottom 20 is provided with an upwardly extending flange 23. In each flange 23 a hole 24 is arranged adjacent to the front edge of the flange so that the two holes are coaxial with each other. The rear end portion of the flat bottom 20 tapers rearwardly so that the front end portion of the straight bar 10 fits snugly between the rear ends of the flanges 23. A pair of holes 25 are provided in the rear end portion of the flat bottom 20 so that the holes 11 in the straight bar can be arranged coaxially therewith and bolts 26 extend through the holes 11 and 25 and secure the hinge member H to the straight bar 10.

In Figures 1 and 2 a plow beam 27 is indicated on which a clamp C is adjustably and removably secured. The clamp C comprises a plate 28 adapted to be placed flatly against the outside of the plow beam 27 so that it projects above and below said beam. A second clamp plate 29 is arranged on the other side of the plow beam oppositely to the first named clamp plate 28 and a plurality of bolts 30 extending through the two clamp plates above and below the plow beam 27 secure the plates on the beam in adjusted position. An arm 31 is fastened in any preferred conventional manner to the first named clamp plate 28 and projects at right angles laterally therefrom. The outer portion 32 of said arm is bent downwardly at a right angle and a diametrical hole 33 is provided in the arm portion 32 adjacent to the lower end thereof and extends parallel to the arm portion 31.

The lower end portion of the arm portion 32 is arranged between the flanges 23 of the hinge member H, and a pin 34 or the like extending through the holes 24 in said flanges 23 and the hole 33 in the arm portion 32 attaches the hinge member H and the tiller members 10, 12 and 15 pivotally to the arm portion 32. A cotter pin 34a prevents accidental displacement of the pin 34.

In the Figures 1, 4, 5 and 6 the tiller arm A and the hinge member H are attached to a plow moldboard 35 by means of a bracket B comprising an angular portion 36, a second angular portion 37 and a bridge plate 38 connecting the two angular portions. The moldboard 35 is secured to the plow beam 27 rearwardly of the clamp C and the bracket B is bolted onto the rear surface of the moldboard. The legs of the bracket portion 36 extend at an obtuse angle to each other and the legs of the other bracket portion 37 extend at an acute angle to each other. The bridge plate connects these two portions so that two of the angle legs extend parallel to each other and the other legs project outwardly from each other. The front surfaces of the last named legs are located in the same plane. The bracket B is secured to the moldboard 35 by means of bolts 39 extending through the moldboard, the secondly named bracket portions 36 and 37 and a pair of wedge shaped washers 40 arranged between the moldboard and the angle legs to enable the latter to be fitted onto various makes of plows since the moldboards of the several plows slant at different angles.

The rearwardly extending bracket legs are provided with coaxial holes 41 and the hinge member H is arranged so that the flanges 23 thereof are located outside of these bracket legs and that the holes 24 in said flanges are coaxial with the holes 41 and the narrow front portion 21 of the hinge bottom 20 is located underneath the bridge plate 38. A pin 42 extends through the holes 24 and 41 and attaches the hinge member H and the tiller arm A pivotally onto the bracket B. A set screw 43 extends threadedly through the tapped hole 22 in the hinge bottom portion 21 and engages the bridge plate 38 to arrange the tiller arm at a desired angle to the hinge member so that the lower tiller member 12 is located with its lower surface approximately on the seed bed bottom. A jam nut 44 on the set screw 43 prevents accidental disarrangement of the said set screw.

In use the depth of the furrow to be made by a plow is decided and then the set screw 43 is adjusted until the lowermost portion of the lower tiller member 12 is located in the desired position. When the furrow is then cut by adjacent plow the loose soil turned onto tiller arm A in preceding open furrow is worked from the bottom by the tiller arm A following the plow. The tiller arm secured to the angular arm 31 is located in open furrow and reworks an adjacent cut and worked furrow by plow with tiller arm A reworking soil from the plow of which is attached thereto.

I claim:

1. A tiller arm for attachment to a plow, comprising an elongated straight bar, means for coupling one end of said bar to the moldboard of the plow for movement therewith along a path paralleling the path of travel of plow share, a lower tiller arm having a straight front end portion underlying the rear end portion of the straight bar, and an upper tiller arm having a straight front end portion overlying the rear end portion of the straight bar, the overlapping portions of said arms and the bar being rigidly connected with each other and the upper tiller arm member being offset downwardly in the rear of the straight bar and disposed in close contact with the lower tiller arm, said arms having the rear ends thereof upwardly and forwardly curved.

2. A tiller attachment for a plow including an upwardly curved tiller arm having a straight front end portion a hinge member secured to said front end of the tiller arm, said hinge member comprising a flat bottom and a pair of upwardly extending flanges on the longitudinal edge portions of said bottom, means secured to the plow for pivotally supporting the hinge member, said means comprising a bracket having two angular portions one of which being shaped to have an obtuse apex angle and the other an acute apex angle, and a bridge plate connecting two legs of said angular portions so that said legs extend parallel to each other, the other legs being secured to the moldboard of the plow.

3. A tiller attachment for a plow, including an upwardly curved tiller arm having a straight front end portion, a hinge member secured to said front end portion of the tiller arm, said hinge member having a flat bottom portion and a pair of upwardly extending flanges on the longitudinal edges of the bottom portion, means secured to the plow for pivotally supporting said hinge member, said means comprising a bracket having two angular portions one of which is shaped to have an obtuse apex angle and the other one an acute apex angle, a bridge plate connecting two legs of said angular portions so that said legs extend parallel to each other, the other legs being secured to the moldboard of the plow, the first named legs being pivotally connected with the flanges of said hinge member, the bottom of said hinge member extending forwardly under the bridge plate, and a set screw extending through the front end portion of the hinge bottom and engaging the bridge plate to adjust the tiller arm selectively at a preferred angle with respect to the bracket.

JULIUS LOTHEN.

REFERENCES CITED

The following references are of record in the file of this patent:

UNITED STATES PATENTS

| Number | Name | Date |
|---|---|---|
| 1,263,690 | Maker | Apr. 23, 1918 |
| 1,581,395 | Daskin | Apr. 20, 1926 |
| 1,847,336 | Fike | Mar. 1, 1932 |
| 2,257,650 | Pfeifer et al. | Sept. 30, 1941 |

FOREIGN PATENTS

| Number | Country | Date |
|---|---|---|
| 743,481 | France | Jan. 10, 1933 |